United States Patent
Takamatsu et al.

(10) Patent No.: US 8,950,697 B2
(45) Date of Patent: Feb. 10, 2015

(54) HANDLE ASSEMBLY FOR SPINNING REEL

(71) Applicant: Shimano Inc., Sakai, Osaka (JP)

(72) Inventors: Takuji Takamatsu, Osaka (JP); Hirokazu Hiraoka, Osaka (JP)

(73) Assignee: Shimano Inc., Osaka (JP)

( * ) Notice: Subject to any disclaimer, the term of this patent is extended or adjusted under 35 U.S.C. 154(b) by 13 days.

(21) Appl. No.: 13/864,552

(22) Filed: Apr. 17, 2013

(65) Prior Publication Data

US 2014/0027555 A1    Jan. 30, 2014

(30) Foreign Application Priority Data

Jul. 24, 2012    (JP) ................................. 2012-163683

(51) Int. Cl.
*A01K 89/01*    (2006.01)
*A01K 89/00*    (2006.01)

(52) U.S. Cl.
CPC ................................... *A01K 89/006* (2013.01)
USPC ......................................... 242/282; 242/283

(58) Field of Classification Search
CPC .. A01K 89/01; A01K 89/0101; A01K 89/006
USPC ................................................. 242/282, 283
See application file for complete search history.

(56) References Cited

U.S. PATENT DOCUMENTS

| | | | | |
|---|---|---|---|---|
| 7,070,137 | B2 * | 7/2006 | Nishikawa et al. | 242/282 |
| 7,163,168 | B2 * | 1/2007 | Sugawara et al. | 242/284 |
| 7,614,577 | B2 * | 11/2009 | Ochiai et al. | 242/283 |
| 7,815,138 | B2 * | 10/2010 | Sugahara et al. | 242/283 |
| 8,011,610 | B2 * | 9/2011 | Law et al. | 242/283 |
| 8,152,087 | B2 * | 4/2012 | Hayashi | 242/282 |
| 2004/0140385 | A1 * | 7/2004 | Nishikawa et al. | 242/283 |
| 2004/0200915 | A1 * | 10/2004 | Nishikawa | 242/282 |
| 2006/0071107 | A1 * | 4/2006 | Ochiai et al. | 242/283 |
| 2008/0257996 | A1 * | 10/2008 | Ochiai et al. | 242/224 |
| 2010/0243781 | A1 * | 9/2010 | Hayashi | 242/224 |
| 2010/0301150 | A1 * | 12/2010 | Law et al. | 242/283 |

FOREIGN PATENT DOCUMENTS

| | | |
|---|---|---|
| JP | 2000-83531 A | 3/2000 |
| JP | 2010-158184 A | 7/2010 |
| JP | 2012-125177 A | 7/2012 |

OTHER PUBLICATIONS

European Search Report of corresponding EP Application No. 13 16 7963.1 dated Nov. 13, 2013.

* cited by examiner

*Primary Examiner* — Emmanuel M Marcelo
(74) *Attorney, Agent, or Firm* — Global IP Counselors

(57) ABSTRACT

A handle assembly for a spinning reel is configured to be mounted onto a drive gear shaft that is rotationally supported on a main body of the spinning reel. The handle assembly includes a metal shaft member, a metal handle arm, a handle grip and a first metal tubular member. The metal shaft member includes a threaded portion disposed at one end for screwing to the drive gear shaft and a coupling portion disposed at the other end. The metal handle arm includes a connected portion pivotally coupled to the coupling portion of the metal shaft member to pivot around a radial axis of the shaft member. The handle grip is rotatably attached to the metal handle arm to rotate around an axis that is parallel to a rotational axis of the metal shaft member. The first metal tubular member includes first and second pipe portions. The first pipe portion is disposed on an outer circumferential side of the metal shaft member for contacting the metal handle arm. The second pipe portion is integrally formed with the first pipe portion for contacting the drive gear shaft. The second pipe portion has a smaller diameter than the first pipe portion.

11 Claims, 8 Drawing Sheets

HANDLE ASSEMBLY FOR SPINNING REEL

CROSS-REFERENCE TO RELATED APPLICATIONS

This application claims priority under 35 U.S.C. §119 to Japanese Patent Application No. 2012-163683, filed Jul. 24, 2012. The entire disclosure of Japanese Patent Application No. 2012-163683 is hereby incorporated herein by reference.

BACKGROUND

1. Field of the Invention

This invention generally relates to a handle assembly for a spinning reel. More specifically, the present invention relates to a spinning reel handle assembly configured to be mounted onto a drive gear shaft that is rotationally supported on the main body of a spinning reel.

2. Background Information

Among the handle assemblies for spinning reel, there is a screw-in-type handle assembly that has a screw-in-type handle shaft with a threaded portion for screwing in the female threaded portion provided to the drive gear shaft of a spinning reel. In the screw-in-type handle assembly, the handle arm can be folded by coupling the base end of the handle arm to the handle shaft in a manner that can be pivoted and by turning the handle shaft in the direction for loosening the screw. There is a well-known screw-in-type handle assembly includes a pressing member disposed on the periphery of the handle shaft and a shaft cover disposed on the outer peripheral side of the pressing member (see, e.g., Japanese Laid-Open Patent Publication No. 2000-83531). The pressing member is made, for example, from a stainless steel alloy, and the cover is made, for example, from an aluminum alloy. The pressing member can make contact with the end surface of the drive gear shaft. The shaft cover makes contact with the base end portion of the handle arm. A spring member is attached between the pressing member and the shaft cover. When the handle shaft is screwed into the drive gear shaft, the pressing member that makes contact with the drive gear shaft contracts the spring member, and the spring member presses the shaft cover. Accordingly, the wobbling of the shaft cover and the handle shaft can be inhibited, and easy loosening of the handle can be prevented.

SUMMARY

In the conventional handle assembly, the end surface of the shaft cover made of an aluminum alloy is strongly pressed to the base end side of the handle arm when the handle shaft is turned to screw the handle assembly into the drive gear shaft. The shaft cover may become deformed when the shaft cover is pressed. If the shaft cover is deformed, the entire handle assembly bends and impairs the ability to obtain a feeling of high rigidity in the handle assembly.

One object of the present invention is to obtain a feeling of high rigidity in a handle assembly for a spinning reel.

A handle assembly for a spinning reel according to a first aspect of the present invention can be mounted onto a drive gear shaft that is rotationally supported on a rotatable manner to a main body of the spinning reel. The handle assembly basically includes a metal shaft member, a metal handle arm, a handle grip and a first metal tubular member. The metal shaft member includes a threaded portion disposed at one end for screwing to the drive gear shaft and a coupling portion disposed at the other end. The metal handle arm includes a connected portion pivotally coupled to the coupling portion of the metal shaft member to pivot around a radial axis of the shaft member. The handle grip is rotatably attached to the metal handle arm to rotate around an axis that is parallel to a rotational axis of the metal shaft member. The first metal tubular member includes a first pipe portion and a second pipe portion. The first pipe portion is disposed on an outer circumferential side of the metal shaft member for contacting the metal handle arm. The second pipe portion is integrally formed with the first pipe portion for contracting the drive gear shaft. The second pipe portion has a smaller diameter than the first pipe portion.

In this handle assembly, the second pipe portion of the first tubular member makes contact with the drive gear shaft, and the first pipe portion makes contact with the handle arm when the shaft member is screwed into the drive gear shaft. The second tubular member making contact with the handle arm and the drive gear shaft enables the handle assembly to be coupled to the drive gear shaft without too much wear. Here, by making the first tubular member from a hard metal, the first pipe portion is not easily deformed, and the handle assembly is not easily bent even if the first pipe portion of the first tubular member makes contact with the handle arm and receives a compressive load. Consequently, a feeling of high rigidity can be obtained in a screw-in-type handle assembly.

The handle assembly for a spinning reel according to a second aspect of the present invention relates to the handle assembly according to the first aspect of the present invention that further comprises a second metal tubular member having a lower rigidity than the first metal tubular member. The second tubular member is disposed on the outer circumferential side of the second pipe portion. The second metal tubular member has a first end and a second end. The first end is farther from the reel main body than the second end. The first end is supported at a portion between the first pipe portion and the second pipe portion of the first tubular portion. In this case, the design of the outer peripheral side of the handle shaft can be enhanced according to the second tubular member, and foreign matters do not adhere easily to the coupling section.

The handle assembly for the spinning reel according to a third aspect of the present invention relates to the handle assembly according to the second aspect of the present invention wherein the second tubular member the second metal tubular member has a diameter which gradually increases towards the second end from the first end, and the reel main body includes a boss portion for supporting the drive gear shaft, the boss portion being disposed between the second pipe portion of the first metal tubular member and the second end of the second metal tubular member. In this case, the boss portion can be covered with the second end side of the second tubular member. Therefore, the infiltration of foreign matters from the boss portion can be reduced.

The handle assembly for the spinning reel according to a fourth aspect of the present invention relates to the handle assembly according to the second or the third aspect of the present invention wherein the second metal tubular member has a female threaded part on an inner circumferential surface of the first end, and the first metal tubular member has a male threaded part on its outer circumferential surface that is screwed to the female threaded part. In this case, the first tubular member and the second tubular member are coupled by a screw coupling. Therefore, the work of assembling the first tubular member and the second tubular member is easy.

The handle assembly for the spinning reel according to a fifth aspect of the present invention relates to the handle assembly according to any one of the second to the fourth aspects of the present invention wherein the first metal tubular member is made from a stainless steel alloy, and the second tubular member and the metal handle arm are made from an aluminum alloy. In this case, even if the first tubular member makes contact with and is interposed by the handle arm and the drive gear shaft, the first tubular member is made from a hard stainless steel alloy, hence the first tubular member is not easily deformed.

The handle assembly for the spinning reel according to a sixth aspect of the present invention relates to the handle assembly according to any one of the second to the fifth aspects of the present invention wherein the metal handle arm has a first annular surface that is formed orthogonally to the metal shaft member and that extends radially outward of the connected portion. The first pipe portion has a second annular surface that contacts the first annular surface. The coupling portion and the connected portion are disposed radially inward of the first annular surface and the second annular surface.

In this case, the second annular surface of the first pipe portion makes contact with the first annular surface of the handle arm. Furthermore, the coupling portion and the connected portion are disposed radially inward of the first annular surface and the second annular surface. Therefore, the first pipe portion makes contact with the entire circumference of the first annular surface of the handle arm; the coupling portion and the connected portion are covered by the first pipe portion and cannot be seen from the outside. Consequently, the design of the coupling section of the handle arm from the base end portion of the handle arm to the first tubular member can be enhanced, and foreign matters do not easily adhere to the coupling section.

Also, the handle arm is fixed by the first annular surface and the second annular surface making contact with each other. Therefore, a force functions equally between the handle arm and the first pipe portion. Consequently, even if a compressive load is applied to the first pipe portion through contact with handle arm, deforming the first pipe portion is more difficult, and bending the handle assembly is more difficult. Therefore, a greater feeling of high rigidity can be obtained in a screw-in-type handle assembly.

The handle assembly for the spinning reel according to a seventh aspect of the present invention relates to the handle assembly according to the sixth aspect of the present invention wherein the coupling portion has a first clevis portion with a single clevis. The connected portion has a second clevis portion with a double clevis. The first clevis portion penetrates the second clevis portion and a bottom portion of the double clevis is formed from an arc-shaped slit. In this case, the shaft member with a small cross section is the first clevis portion with a single clevis. Therefore, the pivot coupling structure of the shaft member and the handle arm is simple. Also, the first pipe portion covers the first clevis portion that includes a slit and the second clevis portion. Therefore, foreign matters do not easily adhere to the first and second clevis portions.

The handle assembly for the spinning reel according to an eighth aspect of the present invention relates to the handle assembly according to the seventh aspect of the present invention that further comprises a connecting shaft extending into the first clevis portion and the second clevis portion. In this case, the handle arm and the shaft member can be coupled in a manner that can be pivoted by inserting the connecting shaft into the first clevis portion and the second clevis portion.

The handle assembly for the spinning reel according to a ninth aspect of the present invention relates to the handle assembly according to the eighth aspect of the present invention wherein the coupling portion includes a threaded shaft that is screwed to one of the double clevis of the second clevis portion. In this case, the attachment and removal of the connecting shaft is possible. Therefore, the screwing direction of the shaft member can be varied according to the attachment position of either the right or the left of the handle assembly. Consequently, easy loosening of the shaft member can be prevented.

The handle assembly for the spinning reel according to a tenth aspect of the present invention relates to the handle assembly according to any one of the sixth to the ninth aspects of the present invention wherein the second annular surface of the first pipe portion has an outer diameter that is substantially equal to the first annular surface, and the first pipe portion has an outer circumferential surface that connect smoothly with an outer circumferential surface of the metal handle arm. In this case, the design of the handle assembly when the first pipe portion makes contact with the first annular surface can be enhanced, and the outer peripheral surface of the handle arm and the outer peripheral surface of the first pipe portion are smoothly connected. Therefore, bait or the like do not adhere easily to the outer peripheral surface.

The handle assembly for the spinning reel according to an eleventh aspect of the present invention relates to the handle assembly according to any one of the second to the tenth aspects of the present invention wherein the connected portion is disposed at the base end of the metal handle arm. The handle grip is disposed at the tip of the metal handle arm. In this case, the functional effects described above are manifested in a single handle-type handle assembly wherein there is only one handle grip.

The handle assembly for the spinning reel according to a twelfth aspect of the present invention relates to the handle assembly according to any one of the second to the tenth aspects of the present invention wherein the connected portion is disposed at the center portion of the metal handle arm. The handle grip is disposed at both ends of the metal handle arm. In this case, the functional effects described above are manifested in a double handle-type handle assembly wherein there are two handle grips.

According to the present invention, by making the first tubular member from a hard metal, the first pipe portion does not easily become deformed, and the handle assembly does not bend easily even if the first pipe portion of the first tubular member makes contact with the handle arm and a compressive load is applied. Therefore, a feeling of high rigidity can be obtained in a screw-in-type handle assembly.

BRIEF DESCRIPTION OF THE DRAWINGS

Referring now to the attached drawings which form a part of original disclosure.

DETAILED DESCRIPTION OF EMBODIMENTS

Selected embodiments will now be explained with reference to the drawings. It will be apparent to those skilled in the art from this disclosure that the following descriptions of the embodiments are provided for illustration only and not for the purpose of limiting the invention as defined by the appended claims and their equivalents.

Figure 1:
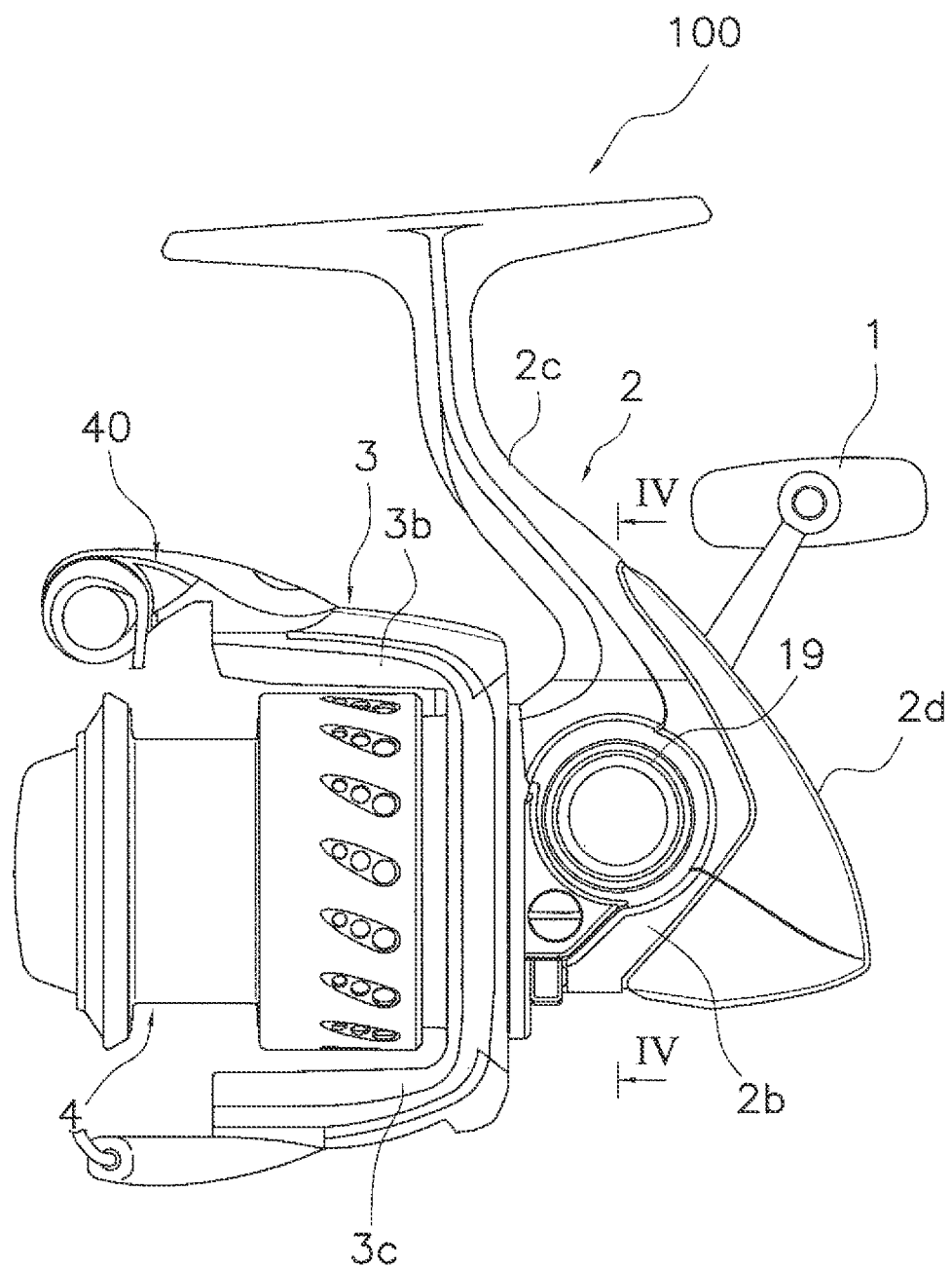
FIG. 1 is a side elevational view of a spinning reel in accordance with one embodiment of the present invention.
Figure 2:
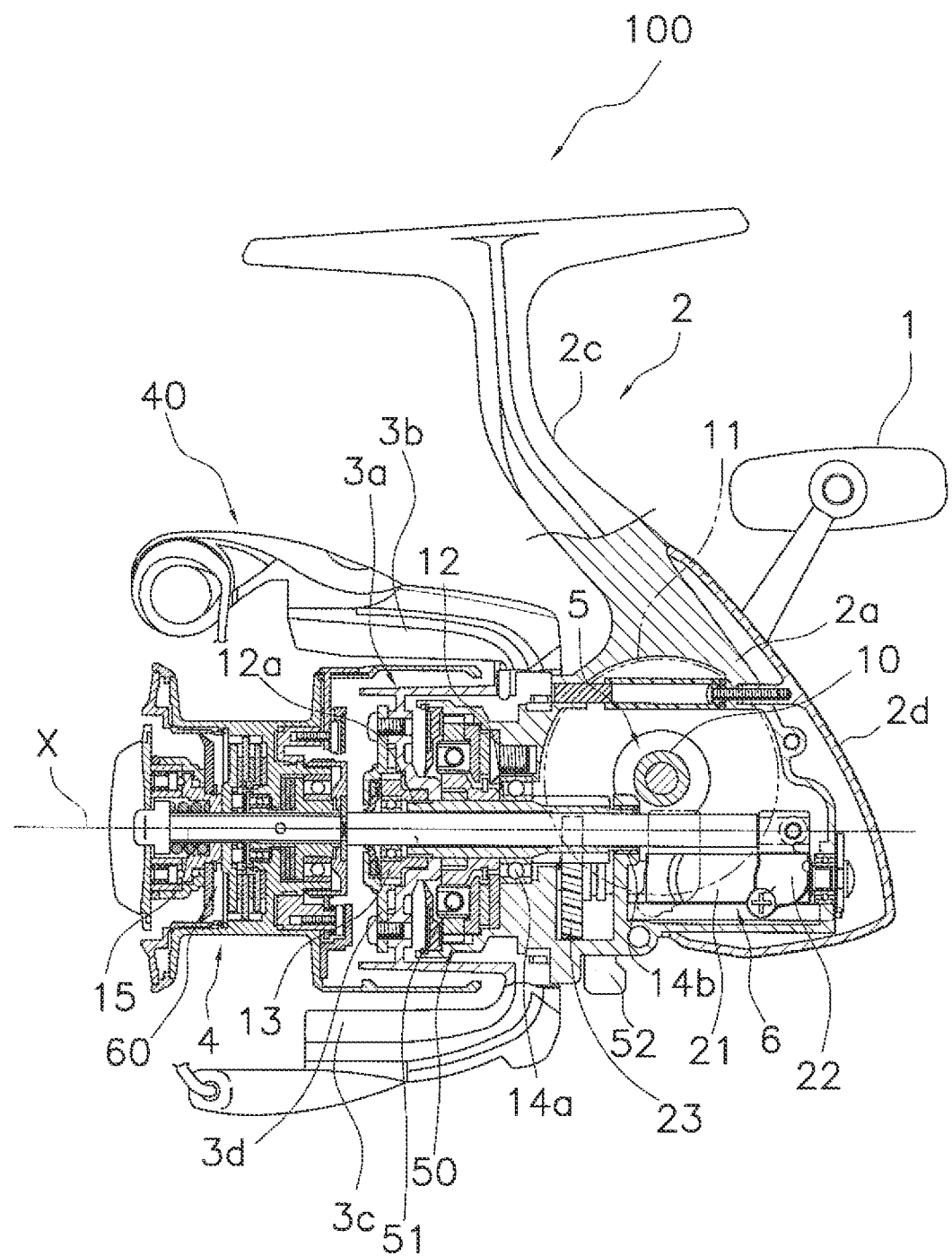
FIG. 2 is a side cross-sectional view of the spinning reel illustrated in FIG. 1.
Figure 3:
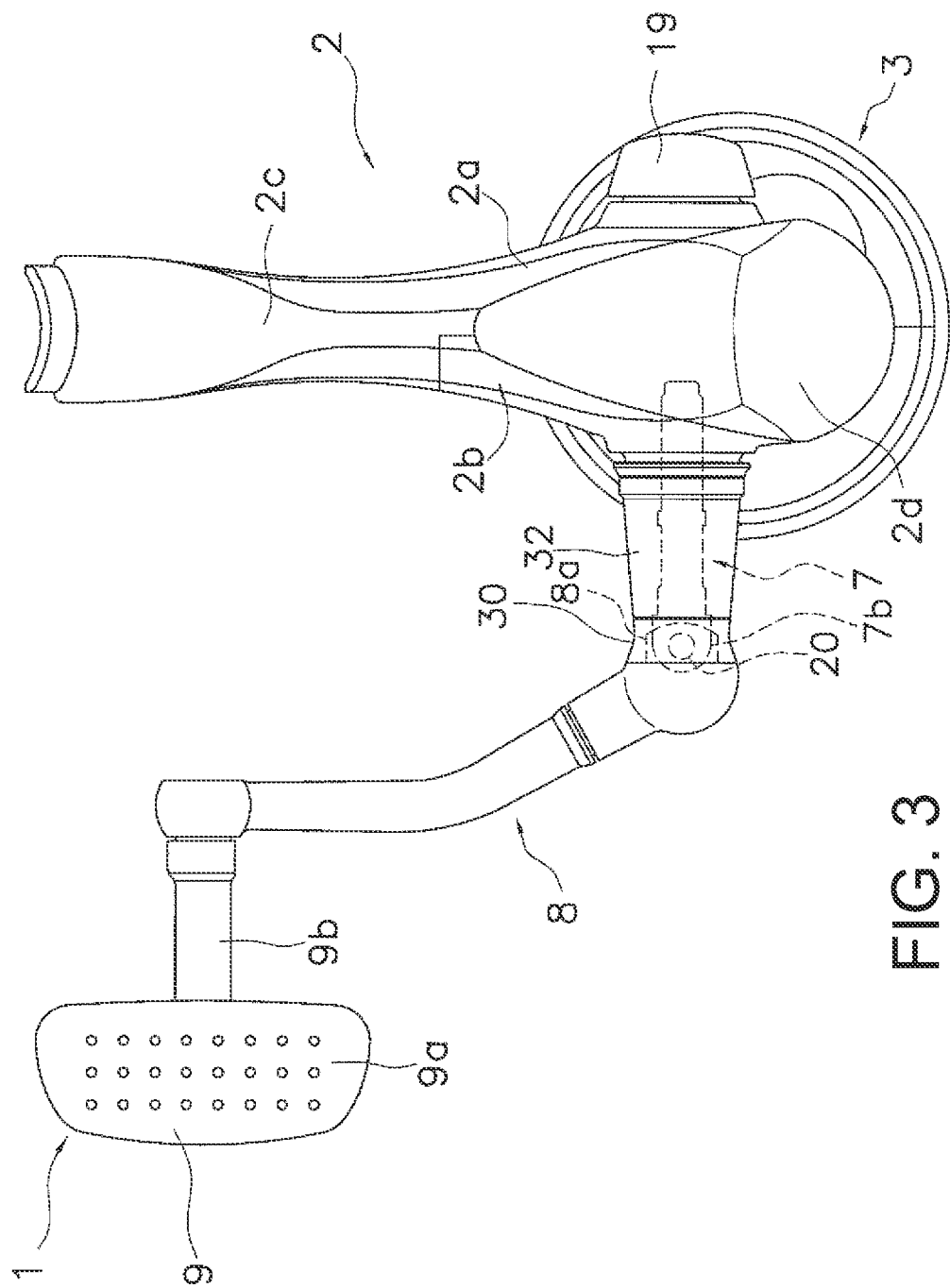
FIG. 3 is a rear elevational view of the spinning reel illustrated in FIGS. 1 and 2.

Referring to FIGS. 1 and 2, a spinning reel 100 is illustrated in accordance with one embodiment of the present invention. Basically, the spinning reel 100 includes a handle assembly 1, a reel main body 2, a rotor 3, and a spool 4 as illustrated in FIGS. 1 to 3. The reel main body 2 supports the handle assembly 1 in a rotatable manner. The rotor 3 is used for winding fishing line onto the spool 4. The rotor 3 is rotatably supported at the front portion of the reel main body 2. The spool 4 has an outer peripheral surface for winding fishing line thereon. The spool 4 is disposed at the front portion of the rotor 3 while being able to be moved back and forth. The handle assembly 1 can be attached either on the right side (refer to FIGS. 1 and 2) or the left side (refer to FIGS. 3 and 4) of the reel main body 2, and a cap member 19 is attached to the side on which the handle assembly 1 is not attached (the right side of the reel main body 2 in FIGS. 3 and 4).

Configuration of the Handle Assembly

As illustrated in FIGS. 3 to 6, the handle assembly 1 is a single handle type. The handle assembly 1 includes a shaft member 7, a handle arm 8, a handle grip 9, a first tubular member 30, a second tubular member 32 and a connecting shaft 20. The shaft member 7 is attached to the inner peripheral portion of the drive gear shaft 10, which is to be described later, in a relatively non-rotatable state. In the illustrated embodiment, the shaft member 7 is screwed to the inner peripheral portion of the drive gear shaft 10. The shaft member 7 is disposed by protruding the tip portion radially outward from the tip portion of the drive gear shaft 10. The handle arm 8 extends radially from the base end portion of the shaft member 7. The handle arm 8 is pivotally attached to the shaft member 7. The handle grip 9 is attached to the tip of the handle arm 8. The first tubular member 30 contacts the tip portion of the drive gear shaft 10 and the base end portion of the handle arm 8. The first tubular member 30 is interposed between the tip portion of the drive gear shaft 10 and the base end portion of the handle arm 8. The second tubular member 32 is disposed on the outer peripheral side of the first tubular member 30.

Figure 4:
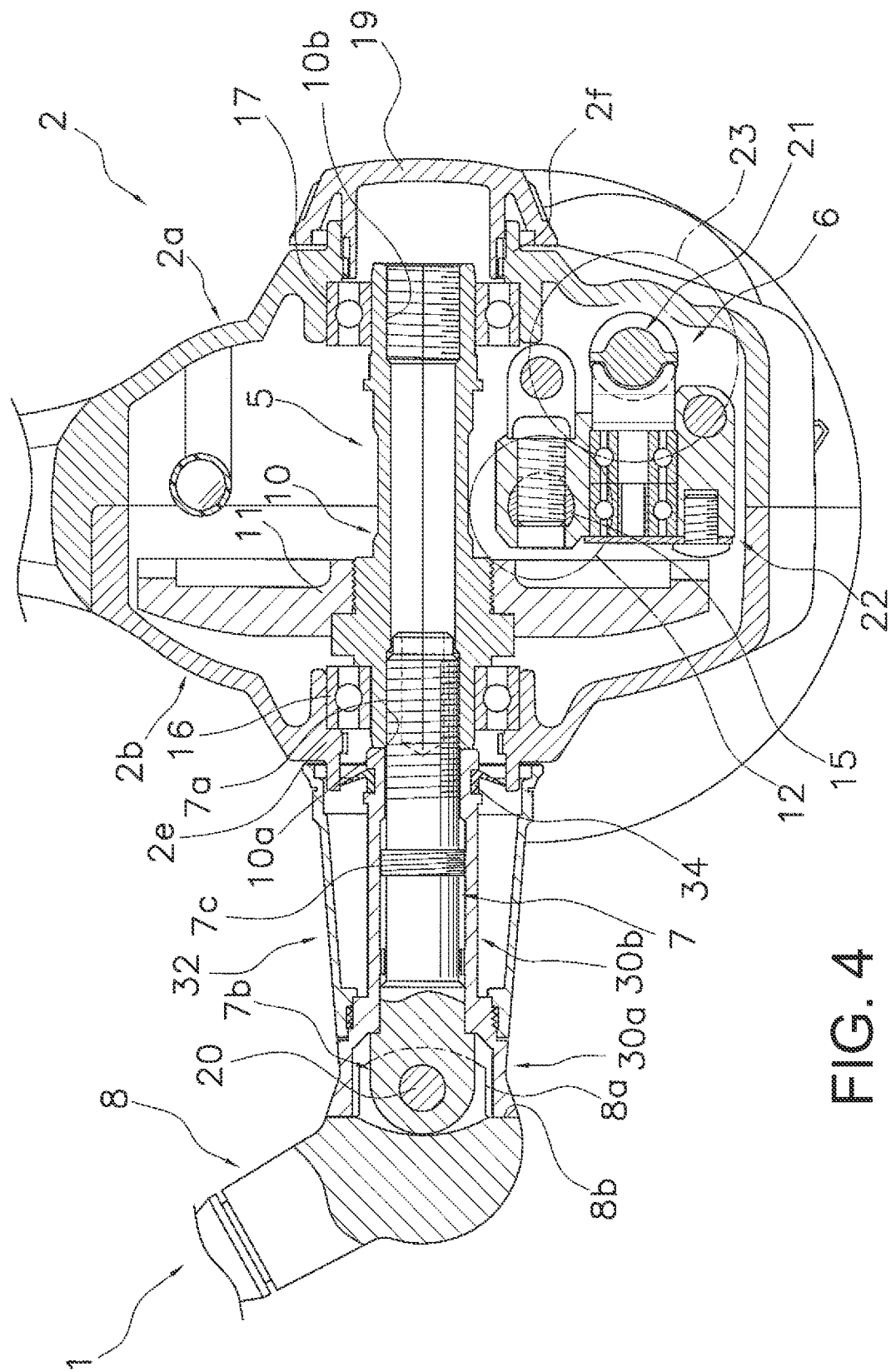
FIG. 4 is a cross-sectional view of the spinning reel illustrated in FIGS. 1 to 3 as viewed along a section line IV-IV in FIG. 1.

As illustrated in FIG. 4, the shaft member 7 includes an attachment threaded portion 7a, a coupling portion 7b and a retaining male threaded portion 7c. The attachment threaded portion 7a is disposed at one end (the right side end portion in FIG. 4) of the shaft member 7. The attachment threaded portion 7a is screwed into the first threaded hole 110a of the drive gear shaft 10, which is illustrated on the left side in FIG. 4. The coupling portion 7b is disposed at the other end (the left side end portion in FIG. 4) of the shaft member 7. The handle arm 8 is pivotally coupled to rotate around the radial axis of the shaft member 7. The retaining male threaded portion 7c is disposed at the middle portion of the shaft member 7 to prevent the first tubular member 30 from separating from the shaft member 7. The shaft member 7 illustrated in FIG. 4 is a male screw. The attachment threaded portion 7a is a left-handed screw (a screw configured to be tightened when turned in the counterclockwise direction). Therefore, even the first threaded hole 10a of the drive gear shaft 10 is a left-handed female screw. In this spinning reel 100, the attachment threaded portion 7a is appended to the shaft member of right-handed screw. The shaft member of right-handed screw is screwed into the second threaded hole 10b of the drive gear shaft 10, which is illustrated on the right side of FIG. 4. Consequently, even if the handle assembly 1 is attached on the left side or the right side of the drive gear shaft 10, when the handle assembly 1 is rotated in the fishing-line winding direction, the fishing-line winding direction is the direction that the screw is tightened, and easy loosening of the handle assembly 1 is prevented.

Figure 5:
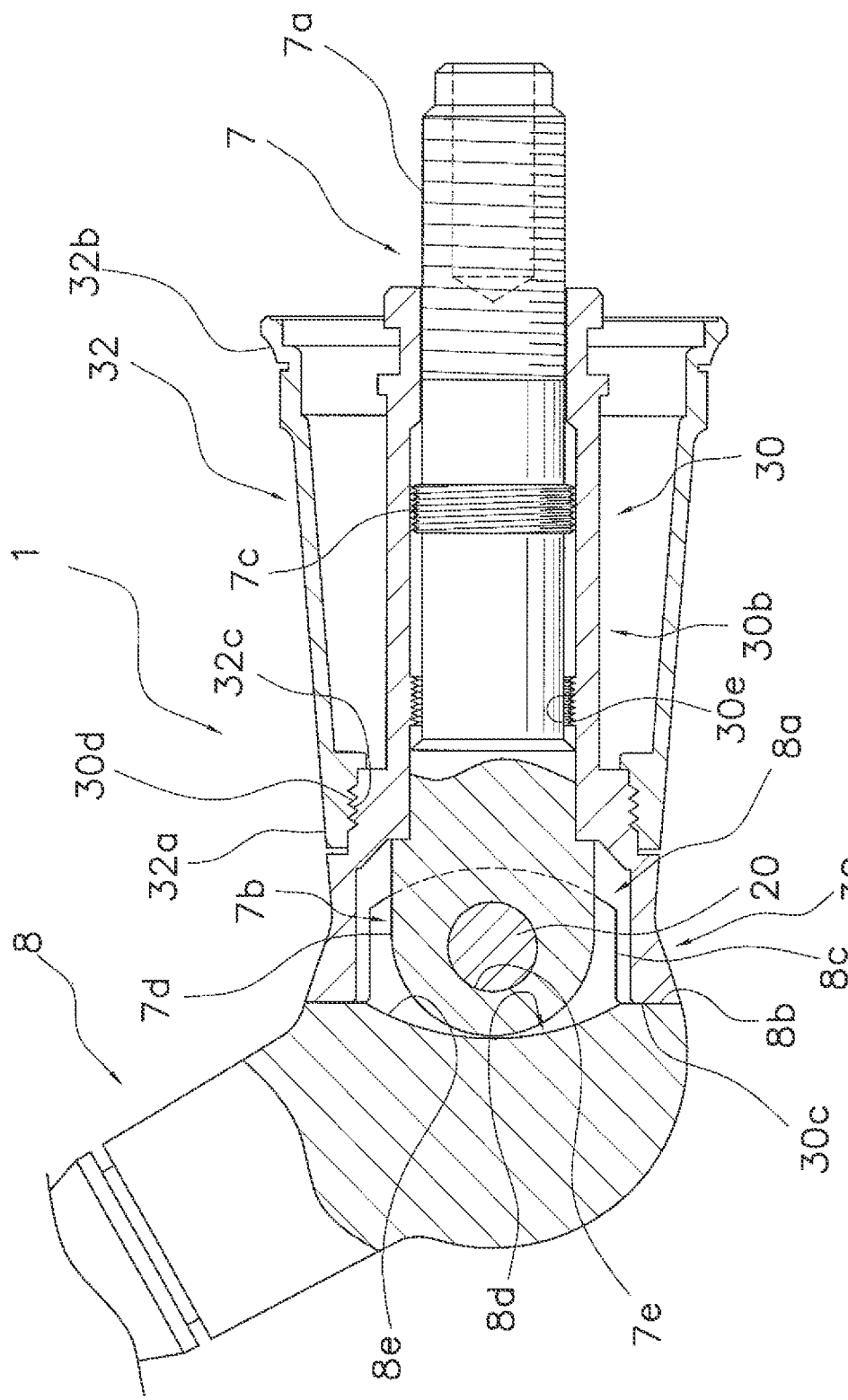
FIG. 5 is a cross-sectional view of the coupling section of the handle assembly.
Figure 6:
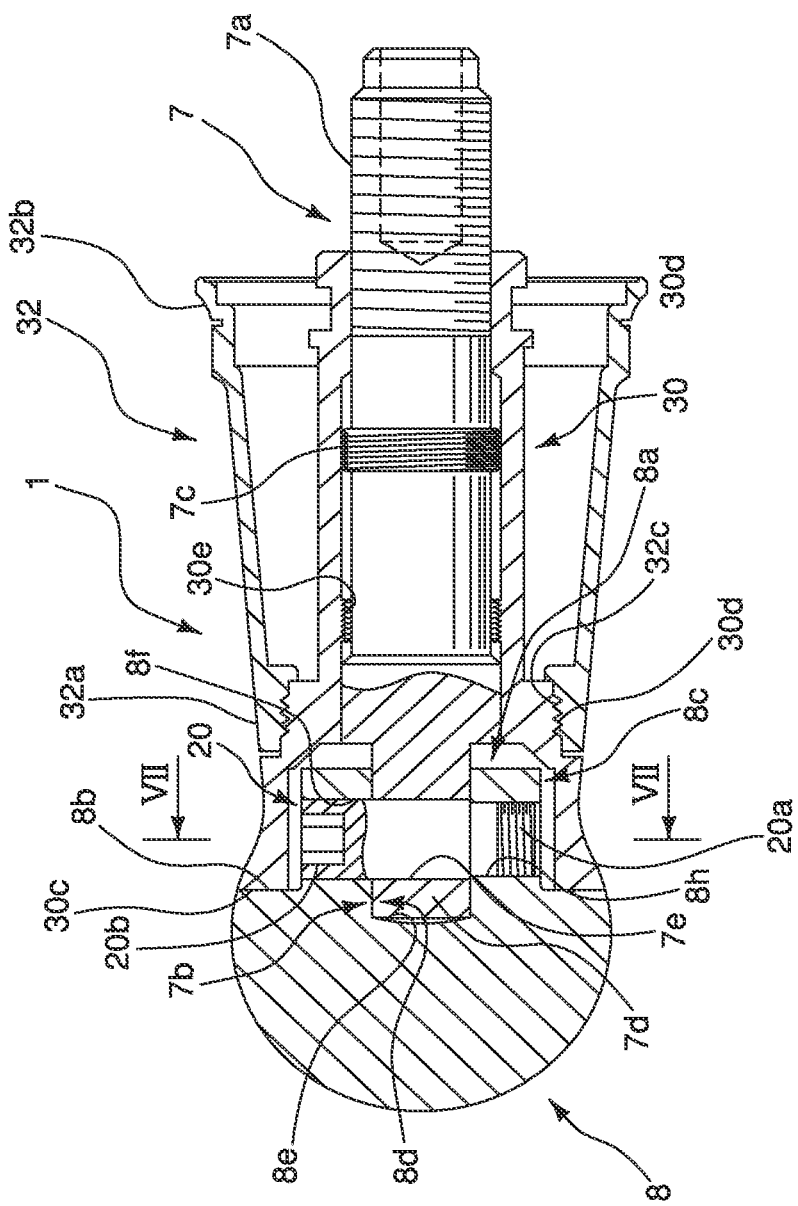
FIG. 6 is a cross-sectional view of the coupling section of the handle assembly as viewed along a section line that is orthogonal to the cross-sectional view in FIG. 5.
Figure 7:
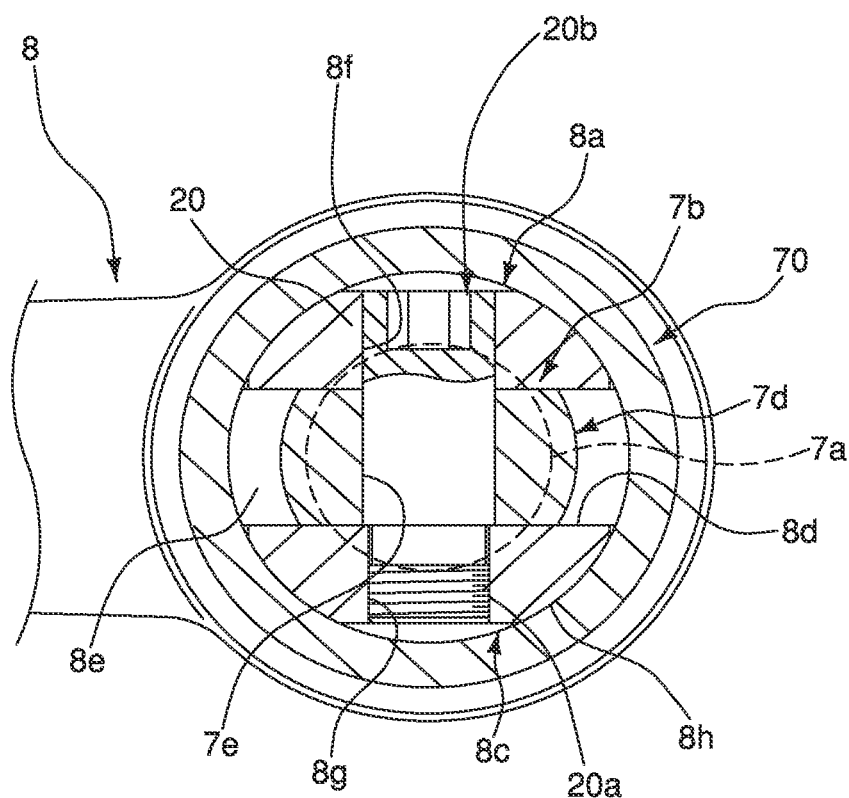
FIG. 7 is a cross-sectional view of the coupling section of the handle assembly as viewed along a section line VII-VII in FIG. 6.

As illustrated in FIGS. 5 to 7, the coupling section 7b is formed to have a larger diameter than that of the attachment threaded portion 7a. The coupling portion 7b has a first clevis portion 7d with a single clevis. The first clevis portion 7d has a shape wherein the large diameter portion of the shaft member 7 has been cutout into two mutually parallel surfaces. The first clevis portion 7d has a first coupling hole 7e. The connecting shaft 20 is inserted into the first coupling hole 7e for coupling the handle arm 8 to the first clevis portion 7d.

As illustrated in FIG. 3, the handle arm 8 is a rod-shaped member made, for example, from an aluminum alloy. The handle arm 8 is formed to extend at a tilt from one end (the bottom side end portion in FIG. 3) towards the opposing direction from the reel main body 2 and, then, to bend at the middle so as to be disposed approximately parallel to the reel main body 2. One end of the handle arm 8 is formed into a roughly spherical shape. As illustrated in FIG. 4, the handle arm 8 has a connected portion 8a at one end. The connected portion 8a is coupled by a connecting shaft 20 to the coupling portion 7b (the left side end portion in FIG. 3) of the shaft member 7 such that the handle arm 8 can be pivoted in a direction that contacts with and separates from the reel main body 2. Also, the handle arm 8 has a first annular surface 8b that extends radially outwards from the base end side of the connected portion 8a. The first annular surface 8b is formed orthogonal to the shaft member 7.

As illustrated in FIG. 5, FIG. 6 and FIG. 7, the connected portion 8a has a second clevis portion 8c with a double clevis wherein the first clevis portion 7d can penetrate. Also, the handle arm 8 has an arc-shaped slit 8d and a bottom portion 8e that is formed from the arc-shaped slit 8d. The slit 8d has a width that is slightly larger than the thickness of the first clevis portion 7d. The slit 8d is formed along the extending direction of the handle arm 8. Also, the handle arm 8 has a second coupling hole 8f and a female threaded hole 8g. The connecting shaft 20 is inserted in one of the parts of the second clevis portion 8c having the second coupling hole 8f and screwed into the other part of the second clevis portion 8c having the female threaded hole 8g. The female threaded hole 8g has a smaller diameter than the second coupling hole 8f. The second coupling hole 8f and the female threaded hole 8g are disposed to be concentric to the first coupling hole 7e. The outside surface 8h (refer to FIG. 7) of the second clevis portion 8c is formed into a roughly circular shape.

A handle grip 9 is attached to the other end (the top side end portion in FIG. 3) of the handle arm 8. The handle grip 9 has a grip portion 9a and a shaft portion 9b. The haft portion 9b is attached to the handle arm 8 to be rotatable around an axis roughly parallel to the shaft member 7. The grip portion 9a is fixed to the tip of the shaft portion 9b to be held by a fisherman. The grip portion 9a is formed from, for example, synthetic resin, rubber, cork, or the like, and the shaft portion 9b is a tubular member made, for example, from a metal.

The connecting shaft 20 is a threaded shaft provided at the tip with a threaded portion 20a that is screwed into the female threaded hole 8g of the second clevis portion 8c. The threaded portion 20a has a smaller diameter than the other sections. A tool locking portion 20b of for example, a hexagonal shape is formed on the base end surface of the connecting shaft 20. Consequently, the connecting shaft 20 can be attached to and removed from the connected portion 8a. with a hexagonal wrench, and the shaft member 7 can be replaced with another shaft member.

As illustrated in FIGS. 4 to 6, the first tubular member 30 is disposed on the outer peripheral side of the shaft member 7. The first tubular member is made, for example, from a hard stainless steel alloy. The first tubular member 30 has a first pipe portion 30a and a second pipe portion 30b. The second pipe portion 30b is integrally formed with the first pipe portion 30a. The first pipe portion 30a has a second annular surface 30c that makes contact with the first annular surface 8b of the handle arm 8. The major diameter of the second annular surface 30c is substantially the same as the major diameter of the first annular surface 8b. The coupling portion 7b and the connected portion 8a are disposed radially inward of the first annular surface 8b and the second annular surface 30c. Consequently, the coupling portion 7b, the connected portion 8a and the connecting shaft 20 are covered by the first pipe portion 30a and cannot be seen from the outside. Therefore, the design of the coupling section of the handle arm. 8 from the vicinity of the base end portion of the handle arm 8 to the first tubular member 30 can be enhanced, and foreign matters do not easily adhere to the coupling section.

The outer peripheral surface of the first pipe portion 30a is formed to smoothly connect to the outer peripheral surface on one end side of the handle arm 8. The first tubular member 30 is radially reduced in two stages from the first pipe portion 30a to the second pipe portion 30b. The radially reduced section is disposed between the first pipe portion and the second pipe portion. A coupling male threaded portion 30d is formed on the outer peripheral surface in the radially reduced section of the first tabular member 30 for coupling the second tubular member 32. The radially reduced section defines "a portion between the first pipe portion and the second pipe portion of the first tubular portion".

The second pipe portion 30b has a smaller diameter than that of the first pipe portion 30a. The second pipe portion 30b is disposed adjacent to the outer peripheral surface of the shaft member 7. One end surface (the right end surface in FIG. 4) of the second pipe portion 30b contacts the end surface (the end surface on the left side in FIG. 4) of the drive gear shaft 10. A retaining female threaded portion 30e is formed on the inner peripheral surface that is close to the radially reduced section of the second pipe portion 30b for retaining the shaft member 7. The retaining female threaded portion 30e is screwed to the retaining male threaded portion 7c of the shaft member 7. When removing the first tubular member 30 from the shaft member 7, the handle arm 8 is turned in the direction for loosening the screw while breaking away from the first tubular remember 30. Accordingly, the first tubular member 30 can be removed from the shaft member 7. However, unless this operation is carried out, the first tubular member 30 cannot be separated from the shaft member 7 even if the handle assembly 1 is removed from the drive gear shaft 10. Normally, the first tubular member 30 is removed from the shaft member 7 only when attaching another shaft member as an attachment. A seal member 34 is attached to the outer peripheral surface of the second pipe portion 30b for sealing the space between the first pipe portion 30a and the reel main body 2.

The second tubular member 32 is disposed on the outer peripheral side of the second pipe portion 30b. The second tabular member 32 is a tubular member made from a metal with a lower rigidity than that of the first tubular member 30. The second tubular member 32 has a first end 32a and a second end 32b. The first end 32a of the second tubular member 32 is farther from the reel main body 2 than the second end 32b, The first end 32a of the second tubular member 32 is supported by the first tubular member 30 between the first pipe portion 30a and the second pipe portion 30b. The second tubular member 32 extends towards the second end 32b that is near the reel main body 2 from the first end 32a. In this embodiment, the second tubular member 32 is made from an aluminum alloy. A coupling female threaded portion 32c is formed to the inner peripheral surface on the first end 32a side of the second tubular member 32. The coupling male threaded portion 30d of the first tubular member 30 is screwed into the coupling female threaded portion 32c.

The second tubular member 32 is formed such that the diameter gradually increases towards the second end 32b from the first end 32a. Also the reel main body 2 has a pair of boss portions 2e and 2f, described later, protruding from the sides of the reel main body 2 to support the drive gear shaft 10. The boss portions 2e and 2f can be disposed between the second pipe portion 30b of the first tubular member 30 on the side of the second end 32b of the second tubular member 32. The outer peripheral surface on the first end side 32a of the second tubular member 32 is substantially formed continuous to the outer peripheral surface of the first pipe portion 30a. Therefore, the outer peripheral surface of the first pipe portion 30a is smoothly connected with the outer peripheral surface of the base end portion of the handle arm 8 and the outer peripheral surface on the side of the first end 32a of the second tubular member 32.

To fold this handle arm 8, the rotor 3 is held with the opposite hand from the hand for manipulating the handle arm 8, and then the handle arm 8 is turned in the opposite direction from the winding direction of the handle arm 8. Accordingly, the shaft member 7 is made loose in relation to the first threaded hole 10a (or the second threaded hole 10b) of the drive gear shaft 10, and the handle arm 8 moves in the direction that separates from the reel main body 2. As a result, a space is created between the first annular surface 8b of the handle arm 8 and the second annular surface 30c of the first tubular member 30, the handle arm 8 is made to be able to be pivoted towards the reel main body 2, and the handle arm 8 can be folded.

To return the handle arm 8 to the original position, the rotor 3 is held with the opposite hand from the hand for manipulating the handle arm 8, and the handle arm 8 is turned in the fishing-line winding direction. Accordingly, the shaft member 7 can be screwed tighter to the drive gear shaft 10, and the handle arm 8 moves in the direction that approaches the reel main body 2. As a result, the space between the first annular surface 8b of the handle arm 8 and the second annular surface 30c of the first tubular member 30 is eliminated. Consequently, the second annular surface 30c contacts the first annular surface 8b, the end surface of the second pipe portion 30b contacts the end surface of the drive gear shaft 10, and the handle arm 8 is fixed to the shaft member 7. At this time, a compressive force functions between the second annular surface 30c of the first tubular member 30, which is made from a stainless steel alloy, and the first annular surface 8b of the handle arm 8 when the handle arm 8 is turned with a great force. However, since the rigidity of the first tubular member 30 is high, the second annular surface 30c is not easily deformed. Consequently, a feeling of high rigidity can be obtained when manipulating the handle arm 8.

As illustrated in FIGS. 1 to 4, the reel main body 2 includes a reel body 2a that has an opening, a removable lid member 2b that is attached to the reel body 2a so as to cover the opening, a roughly T-shaped fishing rod attachment leg 2c that is forwardly extended from the reel body 2.a in an obliquely upward direction, and a guard member 2d that is attached to the rear portion towards the bottom portion of the reel body 2a and the lid member 2b. The reel body 2a has a space on the inside. In this space are a rotor drive mechanism 5 for rotating the rotor 3 in conjunction with the rotation of the handle assembly 1 and an oscillating mechanism 6 for uniformly winding a fishing line by moving the spool 4 back and forth.

As illustrated in FIGS. 2 and 4, the rotor drive mechanism 5 includes the drive gear shaft 10, a drive gear 11 and a pinion gear 12. The shaft member 7 of the handle assembly 1 is attached in a non-rotatable state to drive gear shaft 10. The drive gear 11 rotates together with the drive gear shaft 10. The pinion gear 12 meshes with the drive gear 11. As illustrated in FIG. 4, the drive gear shaft 10 is a tubular member that is provided integrally with or as a separate member from the drive gear 11. The drive gear shaft 10 includes a first threaded hole 1.0a and a second threaded hole 10b. The threaded hole 10a. is formed at the left end in FIG. 4 for receiving a left-handed screw. The second threaded hole 10b is formed at the right end in FIG. 4 for a right-handed screw. As illustrated in FIG. 4, the drive gear shaft 10 is supported in a rotatable manner to the reel main body 2 by the bearings 16 and 17 which are attached to the inner peripheral portion of the boss portions 2e and 2f that protrude inward of the reel main body 2. The bearings 16 and 17 are rolling bearings, for example, ball bearings.

The drive gear 11 is a face gear that meshes with the pinion gear 12. As illustrated in FIG. 2, the pinion gear 12 is formed into a tabular shape and penetrates the center portion of the rotor 3. The front portion 12a of the pinion gear 12 is fixed to the rotor 3 with a nut 13. Also, the middle portion and the rear end portion of the pinion gear 12 are supported in a rotatable manner to the reel main body 2 through the bearings 14a and 14b, respectively.

As illustrated in FIG. 2 and FIG. 4, the oscillating mechanism 6 is a mechanism for moving the spool 4 back and forth in conjunction with the drag mechanism 60 by penetrating the center portion of the spool 4 in the longitudinal direction and moving the spool shaft 15 coupled to the drag mechanism 60. The oscillating mechanism 6 includes a traverse camshaft 21, a slider 22 and an intermediary gear 23. The traverse camshaft 21 is disposed parallel to and below the spool shaft 15. The slider 22 moves in the longitudinal direction along the traverse camshaft 21. The intermediary gear 2.3 is fixed to the tip of the traverse camshaft 21. The slider 22 is fixed to the rear end of the spool shaft 15 in a non-rotatable state. The intermediary gear 23 is meshed to the pinion gear 12 through a decelerating mechanism not shown in the drawings.

As illustrated in FIG. 2, the rotor 3 includes a pipe portion 3a, a first rotor arm 3b and a second rotor arm 3c. The first rotor arm 3b and the second rotor arm 3c are disposed at the sides of the pipe portion 3a while opposing each other. The pipe portion 3a, the first rotor arm 3b and the second rotor arm 3c are integrally formed. A front wall 3d is formed at the front portion of the pipe portion 3a. A front portion 12a of the pinion gear 12 and the spool shaft 15 penetrate through the center portion of this front wall 3d. A nut 13 is disposed at the front portion of the front wall 3d. The front portion 12a of the pinion gear 12 is fixed to the rotor 3 with this nut 13.

A bail arm 44 is pivotally disposed at the tips of the first rotor arm 3b and the second rotor arm 3c for winding a fishing line to the spool 4. The bail arm 44 is pivoted between the fishing-line winding position and the fishing-line releasing position illustrated in FIG. 2.

A reverse rotation locking mechanism 50 is disposed within the cylindrical portion 3a of the rotor 3 for preventing and permitting a reverse rotation of the rotor 3. The reverse rotation locking mechanism 50 includes a roller-type one-way clutch 51 wherein an inner race is allowed to rotate freely and a switching lever 52 for switching the one-way clutch 51 between an activation state (a reverse rotation prevention state) and a deactivation state (a reverse rotation permission state).

As illustrated in FIG. 2, the spool 4 is disposed between the first rotor arm 3b and the second rotor arm 3c of the rotor 3. The spool 4 is attached to the tip of the spool shaft 15 through the drag mechanism 60.

In the handle assembly 1 of the spinning reel 100, as described above, the first tubular tubular member 30 is made from a hard metal. Therefore, the first pipe portion 30a is not easily deformed, and the handle assembly 1 does not bend easily even if the first pipe portion 30a of the first tubular member 30 makes contact with the handle arm 8, and is burdened with a compressive force. Consequently, a feeling of high rigidity can be obtained in a screw-in-type handle assembly 1.

Also, the second annular surface 30c of the first pipe 30a portion contacts the first annular surface 8b of the handle arm 8, and the coupling portion 7b and the connected portion 8a are disposed radially inward of the first annular surface 8b and the second annular surface 30c. Therefore, the first pipe portion 30a makes contact with the entire circumference of the second annular surface 30c of the handle arm 8; the coupling portion, the connected portion, and the connecting shaft are covered by the first pipe portion and cannot seen from the outside. Consequently, the design of the coupling section of the handle arm 8 from the base end portion of the handle arm 8 to the first tubular member 30 can be enhanced, and foreign matters do not easily adhere to the coupling section.

Other Embodiments

An embodiment of the present invention was explained above. However, the present invention is not restricted to the embodiment described above, and various modifications are possible in a scope not deviating from the essence of the invention. In particular, the many embodiments and modifications described in the specification can be optionally combined as needed.

Figure 8:
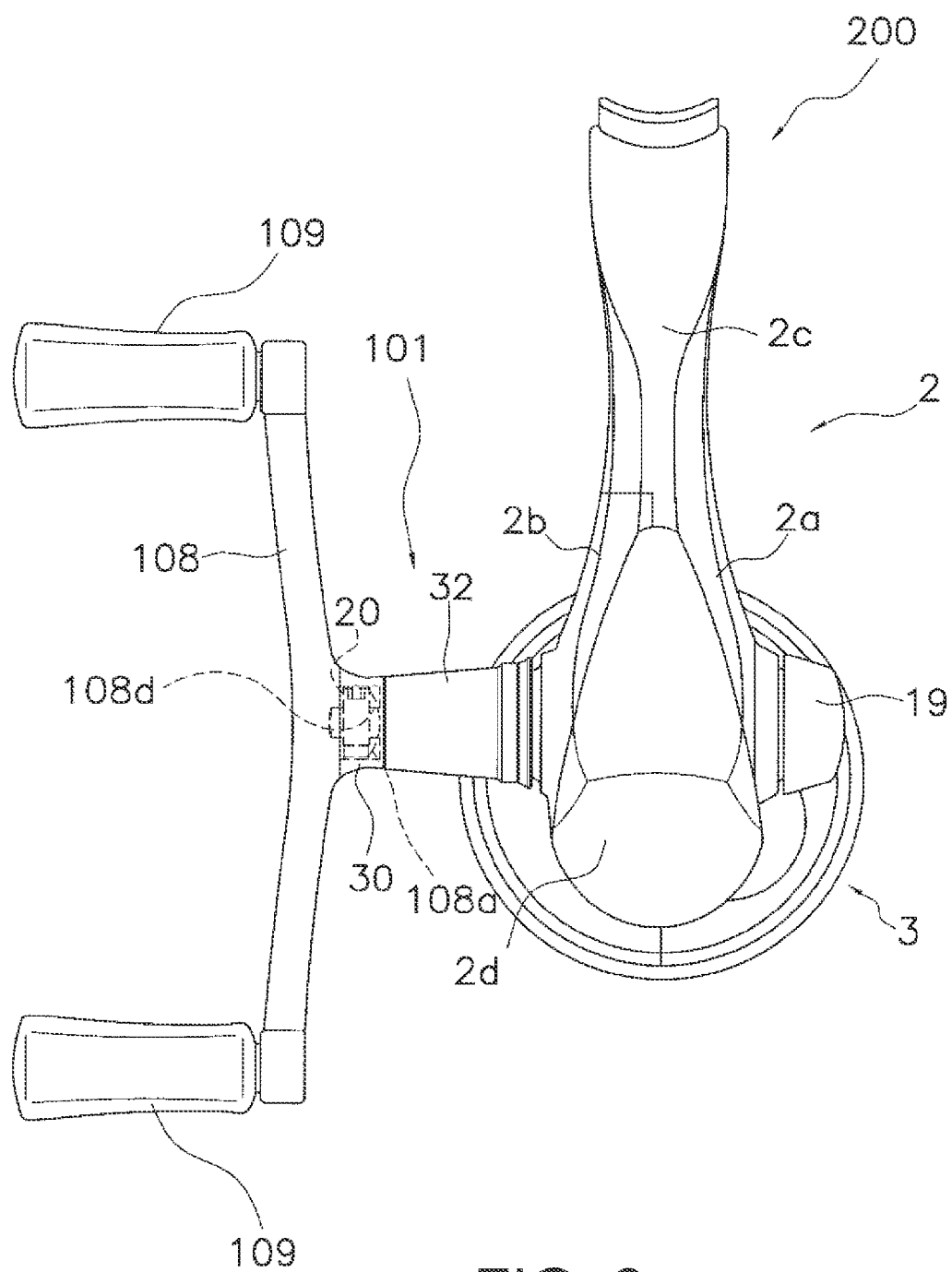
FIG. 8 is a rear elevational view, corresponding to FIG. 3, of a spinning reel illustrating another embodiment.

(a) In the embodiment described above, a handle assembly with a single handle was given as an example. However, the present invention is not restricted to this example. As illustrated in FIG. 8, the handle assembly 101 of the spinning reel 200 is a double handle type, and the configuration of the handle arm 108 varies from the embodiment described above. The handle arm 108 has a connected portion 108a at the center portion in the longitudinal direction. The slit 108d forms the second clevis portion of the connected portion 108a. The slit 108d varies from that in the embodiment described above, and is formed in the orthogonal direction to the longitudinal direction of the handle arm 108. Also, even the connecting shaft 20 is formed along the longitudinal direction. The other shaft members, the first tubular member 30, and the second tubular member 32 are substantially the same.

The embodiment described above can be expressed as follows.

(A) The handle assembly 1 of the spinning reel 100 can be screwed into the drive gear shaft 10 that is attached in a rotatable manner to the reel main body 2 of the spinning reel 100. The handle assembly 1 includes the metal shaft member 7, the metal handle arm 8, the handle grip 9, and the metal first tubular member 30. The shaft member 7 includes the attachment threaded portion 7a to be screwed to the drive gear shaft 10 disposed on one end and the coupling portion 7b disposed on the other end. The handle arm 8 has the connected portion 8a that is coupled to the coupling portion 7b while being able to be pivoted around the radial axis of the shaft member 7. The handle grip 9 is attached to the handle arm 8 while being rotatable around an axis parallel to the shaft member 7. The first tubular member 30 is disposed on the outer peripheral side of the shaft member 7, and has the first pipe portion 30a capable of making contact with the handle arm 8 and the second pipe portion 30b integrally formed with the first pipe portion 30a, has a smaller diameter than that of the first pipe portion 30a, and is capable of making contact with the drive gear shaft 10.

In this handle assembly 1, the second pipe portion 30b of the first tubular member 30 makes contact with the drive gear shaft 10, and the first pipe portion 30a makes contact with the handle arm 8 when the shaft member 7 is screwed into the drive gear shaft 10. The first tubular member 30 makes contact with the handle arm 8, and the drive gear shaft 10 enables the handle assembly 1 to be coupled to the drive gear shaft 10 in a non-wobbly state. Here, by making the first tubular member 30 from a hard metal, the first pipe portion 30a is not easily deformed, and the handle assembly 1 does not bend easily even if the first pipe portion 30a of the first tubular member 30 makes contact with the handle arm 8 and is burdened with a compressive load. Consequently, a feeling of high rigidity can be obtained in a screw-in-type handle assembly 1.

(B) In the handle assembly 1, the second tubular member 32 is also provided and is made of a metal with a lower rigidity than that of the first tubular member 30; the first end 32a that is far from the reel main body 2 is supported by the first tubular member 30 between the first pipe portion 30a and the second pipe portion 30b and is disposed on the outer peripheral side of the second pipe portion 30b by extending from the first end 32a towards the second end 32b that is near the reel main body 2. In this case, the design of the outer peripheral side of the handle shaft can be enhanced according to the second tubular member 32, and foreign matters do not adhere easily to the coupling section.

(C) In the handle assembly 1, the second tubular member 32 is formed for the diameter to gradually increase from the first end 32a towards the second end 32b, and the boss portion 2e formed to the reel main body 2 for supporting the drive gear shaft 10 can be disposed between the first tubular member 30 at the second end 32b side. In this case, the boss section 2e can be covered with the second end 32b side of the second tubular member 32. Therefore, the infiltration of foreign matters from the boss portion 2e can be reduced.

(D) In the handle assembly 1, the second tubular member 32 has a male threaded portion 32c on the inner peripheral surface of the first end 32a. The first tubular member 30 has the coupling male threaded portion 30d for screwing into the female threaded portion 32c on the outer peripheral surface. In this case, the first tubular member 30 and the second tubular member 32 are coupled according to screw coupling. Therefore, the work of assembling the first tubular member 30 and the second tubular member 32 is easy.

(E) In the handle assembly 1, the first tubular member 30 is made from a stainless steel alloy. The handle arm 8 and the second tubular member 32 are made from an aluminum alloy. In this case, even if the first tubular member 30 makes contact with and is interposed by the handle arm 8 and the drive gear shaft 10, the first tubular member 30 is not easily deformed due to the first tubular member 30 being made from a hard stainless steel alloy.

(F) In the handle assembly 1, the handle arm 8 has a first annular surface 8b formed on the radially outward side of the coupling portion 7b while being orthogonal to the shaft member 7. The first pipe portion 30a has a second annular surface 30c that makes contact with the first annular surface 8b, The coupling portion 7b and the connected portion 8a are disposed radially inward of the first annular surface 8b and the second annular surface 30c.

In this case, the second annular surface 30c of the first pipe portion 30a makes contact with the first annular surface 8b of the handle arm 8. Furthermore, the coupling portion 7b and the connected portion 8a are disposed radially inward of the first annular surface 8b and the second annular surface 30c. Therefore, the first pipe portion 30a makes contact with entire circumference of the first annular surface 8b of the handle arm 8. Additionally, the coupling portion 7b and the connected portion 8a are covered by the first pipe portion 30a and cannot be seen from the outside. Consequently, the design of the coupling section of the handle arm 8 from the base end portion of the handle arm 8 to the first tubular member 30 can be enhanced, and foreign matters do not easily adhere to the coupling section.

Also, the handle arm 8 is fixed by the first annular surface 8b and the second annular surface 30c making contact with each other. Therefore, the force functions equally between the handle arm 8 and the first pipe portion 30a. Consequently, even if the first pipe portion 30a is burdened with a compressive load by making contact with the handle arm 8, the first pipe portion 30a is more so prevented from being deforming easily, and the handle assembly 1 is more so prevented from being bent easily. Therefore, a greater feeling of high rigidity can be obtained in a screw-in-type handle assembly 1.

(G) In the handle assembly 1, the coupling portion 7b has the first clevis portion 7d with a single clevis. The connected portion 8a can be penetrated by the first clevis portion 7d, and has the second clevis portion 8c with a double clevis wherein the bottom portion 8e was formed from the arc-shaped slit 8d. In this case, the shaft member 7 with a small cross section is the first clevis portion 7d with a single clevis. Therefore, the pivot coupling structure of the shaft member 7 and the handle arm 8 is simple. Also, the first clevis portion 7d including the slit 8d and the second clevis portion 8c are covered by the first pipe portion 30a. Hence, foreign matters do not easily adhere to the first and second clevis portions.

(H) In the handle assembly 1, the connecting shaft 20 is capable of being inserted into the first clevis portion 7d and the second clevis portion 8c is also provided. In this case, the handle arm 8 and the shaft member 7 can be pivotally coupled by inserting the connecting shaft 20 into the first clevis portion 7d and the second clevis portion 8c.

(I) In the handle assembly 1, the connecting shaft 20 is a threaded shaft that is screwed to one of the parts of the second clevis portion 8c. In this case, the attachment and removal of the connecting shaft 20 is possible. Therefore, the screwing direction of the shaft member 7 can be varied according to the attachment position that is either right or left of the handle assembly 1. Consequently, the easy loosening of the shaft member 7 is prevented.

(K) in the handle assembly 1, the second annular surface 30c of the first pipe portion 30a has substantially the same major diameter as that of the first annular surface 8b, and the outer peripheral surface of the first pipe portion 30a is formed to be smoothly connected to the outer peripheral surface of the handle arm 8. In this case, the design of the handle assembly 1 when the first pipe portion 30a makes contact with the first annular surface 8b can be enhanced, and the outer peripheral surface of the handle arm 8 and the outer peripheral surface of the first pipe portion 30a are smoothly connected. Therefore, bait or the like do not adhere easily to the outer peripheral surface.

(L) in the handle assembly 1, the connected portion 8a is disposed at the base end of the handle arm 8. The handle grip 9 is disposed at the tip of the handle arm 8. In this case, the functional effects described above are manifested in a single handle-type handle assembly 1 wherein there is only one handle grip 9.

(M) In the handle assembly 101, the connected portion 108a is disposed at the center portion of the handle arm 108. The handle grip 109 is disposed at both ends of the handle arm 108. In this case, the functional effects described above are manifested in a double handle-type handle assembly 101 wherein there are two handle grips 109.

What is claimed is:

1. A handle assembly for a spinning reel configured to be mounted onto a drive gear shaft that is rotationally supported on a main body of the spinning reel, the handle assembly comprising:
   a metal shaft member including a threaded portion disposed at one end for screwing to the drive gear shaft and a coupling portion disposed at the other end;
   a metal handle arm including a connected portion pivotally coupled to the coupling portion of the metal shaft member to pivot around a radial axis of the shaft member;
   a handle grip rotatably attached to the metal handle arm to rotate around an axis that is parallel to a rotational axis of the metal shaft member;
   a first metal tubular member including a first pipe portion and a second pipe portion, the first pipe portion being disposed on an outer circumferential side of the metal shaft member for contacting the metal handle arm, the second pipe portion being integrally formed with the first pipe portion for contacting the drive gear shaft, the second pipe portion having a smaller diameter than the first pipe portion; and
   a second metal tubular member having a lower rigidity than the first metal tubular member, the second metal tubular member being disposed on an outer circumferential side of the second pipe portion, the second metal tubular member having a first end and a second end, the first end being farther from the reel main body than the second end, the first end being supported at a portion between the first pipe portion and the second pipe portion of the first tubular portion.

2. The handle assembly according to claim 1, wherein the second metal tabular member has a diameter which gradually increases towards the second end from the first end, and
   the reel main body includes a boss portion for supporting the drive gear shaft, the boss portion being disposed between the second pipe portion of the first metal tubular member and the second end of the second metal tubular member.

3. The handle assembly according to claim 1, wherein
   the second metal tubular member has a female threaded part on an inner circumferential surface of the first end, and
   the first metal tubular member has a male threaded part on its outer circumferential surface that is screwed to the female threaded part.

4. The handle assembly according to claims 1, wherein
   the first metal tubular member is made from a stainless steel alloy, and
   the second tubular member and the metal handle arm are made from an aluminum alloy.

5. The handle assembly according to claim 1, wherein
   the metal handle arm has a first annular surface that is formed orthogonally to the metal shaft member and that extends radially outward of the connected portion,
   the first pipe portion has a second annular surface that contacts the first annular surface, and
   the coupling portion and the connected portion are disposed radially inward of the first annular surface and the second annular surface.

6. The handle assembly according to claim 5, wherein
   the second annular surface of the first pipe portion has an outer diameter that is substantially equal to the first annular surface, and
   the first pipe portion has an outer circumferential surface that connects smoothly with an outer circumferential surface of the metal handle arm.

7. The handle assembly according to claim 5, wherein
   the coupling portion has a first clevis portion with a single clevis, and
   the connected portion has a second clevis portion with a double clevis, the first clevis portion penetrates the second clevis portion and a bottom portion of the double clevis is formed from an arc-shaped slit.

8. The handle assembly according to claim 7, further comprising
   a connecting shaft extending into the first clevis portion and the second clevis portion.

9. The handle assembly according to claim 8, wherein
   the coupling portion includes a threaded shaft that is screwed to one of the double clevis of the second clevis portion.

10. The handle assembly according to claim 1, wherein
    the connected portion is disposed at a base end of the metal handle arm, and
    the handle grip is disposed at a tip of the metal handle arm.

11. The handle assembly according to claim 1, wherein
    the connected portion is disposed at a center portion of the metal handle arm, and
    the handle grip is disposed at both ends of the metal handle arm.

* * * * *